Sept. 21, 1926.
V. LAMBERT
1,600,679
LIQUID MEASURING DEVICE
Filed Dec. 21, 1923
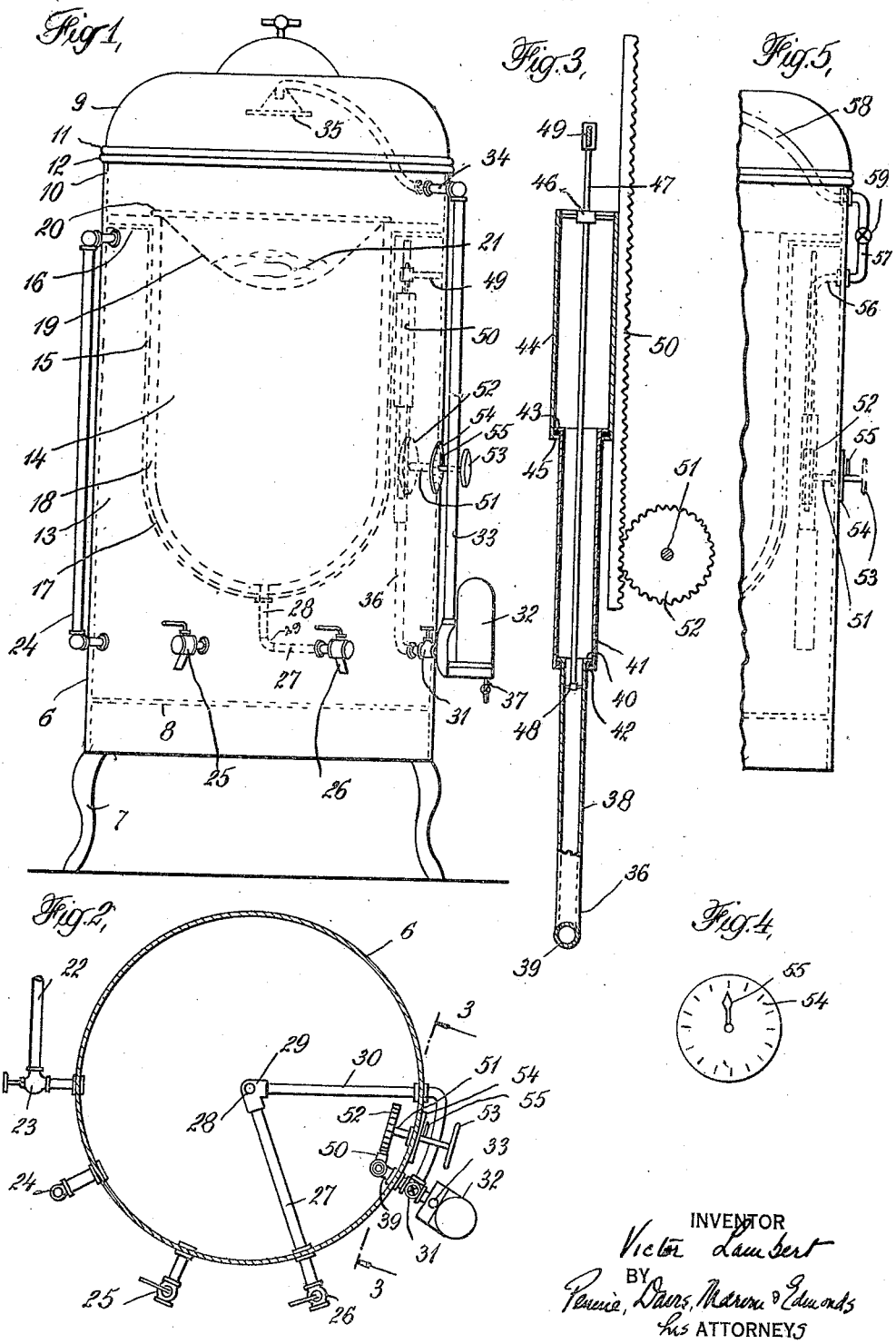
INVENTOR
Victor Lambert
BY
Pennie, Davis, Marvin & Edmonds
his ATTORNEYS Patented Sept. 21, 1926.

1,600,679

UNITED STATES PATENT OFFICE.

VICTOR LAMBERT, OF BROOKLYN, NEW YORK, ASSIGNOR TO AARON M. SLOSS, OF NEW YORK, N. Y.

LIQUID-MEASURING DEVICE.

Application filed December 21, 1923. Serial No. 681,924.

The present invention relates to a device for dispensing liquids in measured quantities and has to do more particularly with a measuring device peculiarly adapted for use in coffee urns, although, as will presently be explained, it is useful in various other connections.

Coffee urns such as are frequently used in restaurants and hotels where coffee is dispensed in large quantities ordinarily consist of a casing which is divided by a suitable partition into two compartments, one of which contains water and the other the coffee liquid. In the coffee compartment is a bag in which the ground coffee is carried, and in the operation of these urns a quantity of water is removed from the water compartment and poured into the coffee compartment through the coffee bag. Sometimes this transfer of water from one compartment into the other is carried on by means of a pump. The water which has percolated once through the coffee is not of sufficient strength for ordinary purposes, and it is removed from the bottom of the coffee compartment and again poured through the coffee bag into the coffee compartment, this percolation being carried on as many times as may be necessary to make coffee of the desired strength. After the coffee making operation is finished the coffee remains within the coffee compartment, to be withdrawn therefrom from time to time as required. When a certain amount of liquid coffee has been removed from this compartment more water must be introduced into it and it is desirable that the amounts of water which are transferred from the water compartment to the coffee compartment either for making the original body of coffee or for replenishing the supply, should be measured. It is also desirable that this measuring device should be of such construction that its use will not interfere with the recirculation of the liquid through the coffee compartment as has been explained.

The present invention is directed to the provision of a measuring device which is adapted for the purpose referred to and it consists essentially of a series of telescoping sleeves mounted within the water compartment and extending vertically therein. The lower sleeve is stationary and is connected to an outlet. The two upper sleeves are capable of being telescoped over the lower sleeve so that the height of the upper end of the series of sleeves may be varied as may be desired. The upper end of the top sleeve is open to the water and this sleeve carries a rack which is engaged by a pinion. The shaft on which the pinion is mounted passes outwardly through the casing of the urn and carries a handle and an indicating pointer which moves over a dial. When water is to be withdrawn from the water compartment the outlet from the lower sleeve is opened and a quantity of water, which is determined by the difference in height of the top of the upper sleeve and the water level in the compartment, will then flow outwardly through this discharge opening. The effective total length of the sleeves, which is determined by their relative adjustment, will determine the amount of water which is withdrawn, and by the use of this device it is possible to withdraw a series of quantities from the water compartment and measure each of these quantities without restoring the quantity of water in the water compartment to its original level. This latter operation, since it necessitates the introduction of cold water into the compartment, reduces the temperature of the body of water and consequently this water cannot be immediately removed and transferred to the coffee compartment, but must be raised to the desired boiling temperature. The device, therefore, provides a means by which measured quantities of water may be transferred from the water compartment to the coffee compartment and the device will operate to measure these quantities regardless of the position of the water level in the water compartment. The position of the upper sleeve will, therefore, determine the amount of water which is withdrawn and after each withdrawal water may be introduced into the water compartment through a suitable supply inlet, or else by reference to the dial it is possible to withdraw successive quantities of water by adjusting the position of the sleeves without introducing a further quantity of water into the compartment.

While the device may be used in connection with any vessel or container from which measured quantities of a freely flowing liquid are to be withdrawn, it is peculiarly adapted for use in connection with a coffee urn, and will here be illustrated in that adaptation. In the accompanying drawings that embodiment of the invention which is now preferred is illustrated in such an urn, and Fig. 1 is a vertical view of the urn showing the device in place therein, Fig. 2 is a plan view of the urn with the top removed, Fig. 3 is a view of the measuring device on the line 3—3 of Fig. 2.

Fig. 4 is a view of the indicating plate and pointer, and

Fig. 5 is a view of a detail of the urn showing the device in a modified form.

Referring to these drawings, the urn is seen to consist of a cylindrical casing 6, made ordinarily of a non-corrodible metal. This casing is mounted on legs 7 in any convenient location, and is provided with a bottom 8 which lies some distance inwardly from the lower end of the casing. Below this bottom is to be placed a heating burner of any convenient form, not illustrated. At the upper end the casing is provided with a cover 9 which slips in place and is provided with a flange 10 which fits into the end of the casing and a bead 11 which rests on a similar bead 12 on the upper rim of the casing. The casing is divided into two compartments 13 and 14 by a partition 15, having a flange 16 which is secured to the inner wall of the casing near its upper end, and a central depression 17 in which is placed a liner 18, usually of porcelain or other similar vitreous material. In the upper end of the compartment 14 which holds the coffee is mounted a bag 19, mounted on a ring 20, of slightly greater diameter than the diameter of the central depression in the partition. This bag is of cloth and carries a quantity of ground coffee 21.

The outer compartment 13 is to hold water and is supplied through an inlet pipe 22 provided with a valve 23 connected to the compartment near its lower end. A gauge device 24 of the usual construction is connected to the compartment near either end thereof, and serves to indicate the level of the water therein. The water compartment is also provided with a clean-out valve 25 located near its lower end.

The coffee compartment is provided with an outlet valve 26, connected by a pipe 27 with the lower end of the compartment, and this valve 26 is used to withdraw such quantities of coffee as may be desired. The pipe 27 is connected to the outlet 28 from the coffee compartment through a three-way fitting 29. Also connected to this three-way connection is a pipe 30 which extends outwardly through the wall of the casing and is connected to a valve 31, which has an outlet connected to a pump 32 which may be manually operated or driven by a motor. The outlet of this pump is connected with a vertically extending pipe 33 which may be in the form of a gauge glass which is in turn connected at its upper end with a pipe 34 which extends through the casing and is connected to a nozzle 35 located centrally of the casing above the bag 19. The valve 31 is also connected with the outlet of the measuring device generally indicated at 36. The pump is provided with a draw-off valve 37.

The measuring device consists of a plurality of sleeves or tubes, the lower tube 38 being the smallest and being connected at its lower end with a pipe 39 which extends through the wall of the casing and is threaded in the valve 31. This tube has a laterally extending flange 40 at its upper end, this flange being of such diameter as to make a close fit within the second tube 41 which has an inturned flange 42 beyond the flange 40 and closely engaging the outer wall of the tube 38. The tube 41 is provided with a lateral flange 43, making a close fit within the third tube 44 which terminates at its lower end in an inturned flange 45 closely fitting the outer wall of the tube 41. The upper end of the third tube carries a spider 46 loosely fitting about a guide rod 47, the lower end of which is secured in a spider 48 which is rigidly mounted within the lower tube 38. The upper end of the guide rod is mounted in a bracket 49 secured to the inner wall of the casing. The upper tube 44 also carries attached to it a rack 50. These several tubes may be freely telescoped within each other and their telescoping movement is guided by means of the rod 47 so as to prevent their buckling. Mounted on a shaft 51 suitably secured in the wall of the casing is a pinion 52 which meshes with the teeth of the rack. This shaft 51 carries a handle 53 at its outer end and secured to the casing and having an aperture through which the shaft extends is a dial 54. This shaft also carries a pointer 55 adjacent the dial and cooperating therewith.

The operation of the urn is as follows: A quantity of water is introduced into the water compartment through the intake valve 23 and the burner is then lighted. When the water has reached the desired temperature a quantity of it is withdrawn and introduced into the coffee compartment. The amount of water so introduced is preferably a definite quantity and to determine the amount which will be drawn from the water compartment the measuring device is made use of. When the water compartment is full or at a predetermined level, as indicated on the gauge glass, the handle 53 is manipulated to set the measuring device for the desired quantity. This measuring device is open at the top and the water which is to be drawn from the water compartment flows through it. Accordingly, when the valve 31 is opened so as to permit the flow of water through the measuring device, such a quantity will be discharged as lies between the top of the measuring device and the liquid level. Consequently the top of the measuring device will be placed in a position so as to permit the desired quantity of liquid to pass through it and the length of the device will grow shorter and shorter as greater and greater quantities are withdrawn. The liquid flowing through the measuring device passes through the valve 31 which is now open to the pump and the latter is operated either manually or electrically to pump this water upwardly through the pipe 33, thence through the pipe 34 and through the nozzle 35. The water so discharged drops down through the mass of coffee supported in the bag 19, and thence into the coffee compartment. This single percolation of the water through the coffee will not make a liquid of the desired strength and recirculation of the liquid within the coffee compartment is necessary. For this purpose the valve 31 is turned so as to close the outlet of the measuring device and connect the pipe 30 with the pump. The pipe 30, as has been explained, is connected with the pipe 28 which forms the discharge pipe from the bottom of the coffee compartment and when the pump is operated the liquid within the coffee compartment is pumped therefrom and again discharged through the nozzle. This circulation may be conducted as many times as may be desired and the strength of the coffee will be shown by its color as it passes through the glass pipe 33.

As the coffee is dispensed from the urn through the valve 26 the amount of liquid in the coffee compartment will diminish and it becomes necessary from time to time to replenish it. It is desirable that the liquid so introduced should be in definite quantities and the measuring device is again made use of to determine the amount of liquid drawn from the water compartment. As the quantity of liquid in this compartment is diminished the tubes of the measuring device will be telescoped farther and farther into each other until only a relatively small quantity of water remains at the bottom of the compartment. During this withdrawal, however, it will be seen that it is not necessary at any time to restore the liquid in the water compartment to its original height in order to make the measuring device effective, and this makes it possible to make more coffee at any time without having to heat the water so introduced into the water compartment.

In Fig. 5 the device is shown in a slightly modified form in which case the transfer of the liquid from the water compartment to the coffee compartment is carried on by making use of the pressure developed in the water compartment when this water is heated. In this particular arrangement the tubes are mounted with the largest tube downward and are adjusted toward and away from the bottom of the water compartment and away from the top. The operation of the rack and pinion is similar to that previously described but the outlet from the measuring device is at the top and is connected with a pipe 56 which extends through the wall of the casing to another pipe 57 which is connected to a pipe 58, carrying the nozzle. The pipe 57 carries a valve 59. With this arrangement the pressure in the water compartment developed by heating the water will force water upwardly through the measuring device, through the several pipes to the nozzle and a quantity of water will be withdrawn, which depends on the difference in height of the intake end of the measuring device and the level of the liquid in the water compartment. The tubes may be telescoped so as to set this intake at any desired point within certain limits and the quantities withdrawn may vary according to the will of the operator.

While the measuring device has been illustrated in that form in which it would ordinarily be used in a coffee urn, it is clear that it has many other applications and it is equally useful in connection with the removal of any freely flowing liquid from a vessel when the liquid is to be withdrawn in measured quantities. For such use the device will ordinarily be mounted at the bottom of the vessel so that the discharge may be by gravity although air pressure may be used so that the modified form of device illustrated in Fig. 5 may also be employed.

I claim:

1. In a coffee urn having a water compartment and a coffee compartment, a plurality of telescoping sleeves mounted vertically within the water compartment, means operable from the exterior of the urn for telescoping the sleeves to vary their effective length, an inlet at one end of one end sleeve, an outlet at the opposite end of the other end sleeve, and a pipe connected with said outlet and leading to the coffee compartment of the urn.

2. A coffee urn comprising a casing, a water compartment and a coffee compartment in the casing, a tube within the water compartment capable of adjustment to vary its height, this tube having its upper end open, and a connection with the lower end of the tube discharging into the coffee compartment.

3. A coffee urn comprising a casing, a water compartment and a coffee compartment in the casing, a collapsible tube in the water compartment having an intake at its upper end, this tube being capable of adjustment to vary the vertical position of the intake, a pump outside the casing connected to the other end of the tube, and a connection from the pump discharging into the coffee compartment.

4. A coffee urn comprising a casing, a water compartment and a coffee compartment in the casing, a pair of telescoping sleeves mounted vertically in the water compartment, a rack connected with one of the sleeves, a pinion engaging the rack, means outside the casing for operating the pinion, a pump outside the casing connected to the lower end of the sleeve not movable by the rack and pinion, and a connection with the pump discharging into the coffee compartment.

5. A coffee urn comprising a casing, a partition therein forming a water compartment and a coffee compartment, a measuring device located within the water compartment and through which water may be discharged, a pump connected with the outlet of the measuring device, and a pipe connected with the pump and discharging into the coffee compartment.

6. A coffee urn comprising the combination of a casing, a partition therein forming a water compartment and a coffee compartment, a measuring device located in the water compartment and having an inlet, this measuring device being capable of adjustment to dispose the inlet in various positions relative to the water level in the water compartment, an outlet from the measuring device, a pump connected with the outlet, a pipe connected with the pump and discharging into the coffee compartment, and means operable from the exterior of the casing for adjusting the measuring device.

7. A coffee urn comprising the combination of a casing, a partition mounted in the casing and forming a water compartment and a coffee compartment, a plurality of telescoping sleeves mounted in the water compartment and open at one end, an outlet pipe connected to the other end of the sleeves, means for transferring water from this measuring device to the coffee compartment, and means operable from the exterior of the casing for producing a relative adjustment of the sleeves to vary the position of the inlet relative to the water level within the water compartment.

8. A coffee urn comprising the combination of a casing, a partition therein forming a water compartment and a coffee compartment, an outlet from the water compartment, a connection from this outlet discharging into the coffee compartment, a plurality of telescoping sleeves mounted vertically within the water compartment, an inlet at one end of one of the end sleeves, an outlet at the opposite end of the other end sleeve connected to the outlet from the compartment, a rack connected to one of the end sleeves, a pinion meshing with this rack, and means operable from the exterior of the casing for operating the pinion to vary the positions of the sleeves relative to each other.

In testimony whereof I affix my signature.

VICTOR LAMBERT.